J. H. RAND
INDEX ELEMENT.
APPLICATION FILED JUNE 11, 1921.

1,428,298.

Patented Sept. 5, 1922.

Fig. 1.

| BANK REFERENCE. | | | | | |
|---|---|---|---|---|---|
| DEPOSITOR HOW LONG | BALANCE | LOANS EXTENDED | LOANS MET SATISFACTORILY | IS ACT. OVERDRAWN | DO YOU CONSIDER CUSTOMER RELIABLE |
| | | | | | |

REMARKS.

FIRM NAME — ADDRESS.
POSITION — BUSINESS.
NAME RAND JAMES H.

| DATE | FOR NO. | FROM NO. | SELLING HOW LONG | HIGHEST CREDIT | OWING NOW | FOR MONTHS | 30-60 | 60-90 | 90-120 | 120-OVER | AS AGREED | UNSATIS. | ATTY.COL. | PAID L. | ACT. | INACT. | WHEN LAST SOLD |
|---|---|---|---|---|---|---|---|---|---|---|---|---|---|---|---|---|---|

CUSTOMERS ADDRESS

FIRM NAME — ADDRESS
POSITION — BUSINESS
NAME

Inventor:
James H. Rand,
by Roberts, Roberts & Cushman
his Attys.

Patented Sept. 5, 1922.

1,428,298

UNITED STATES PATENT OFFICE.

JAMES H. RAND, OF NORTH TONAWANDA, NEW YORK.

INDEX ELEMENT.

Application filed June 11, 1921. Serial No. 476,732.

*To all whom it may concern:*

Be it known that I, JAMES H. RAND, a citizen of the United States of America, and resident of North Tonawanda, in the county of Niagara and State of New York, have invented new and useful Improvements in Index Elements, of which the following is a specification.

This invention relates to index elements for use in indexes of the so-called visible index type, wherein a series of removable hinged index elements are mounted in a suitable frame in overlapped, spaced relation with their free margins exposed to display indexing characters. The principal objects of the invention are to provide a novel and improved form of such index elements, each having a plurality of hinged leaves for receiving entries, whereby the capacity of each element for receiving entries is enlarged, and the several pages of the leaves may if desired be adapted for entries of different classes relating to the same general subject matter, to provide such an element having a plurality of leaves, of which the several parts are permanently assembled and constitute a self-contained unit, and to produce a structure which is economical and easy to make.

In the accompanying drawings, which illustrate a preferred form of the invention,—

Figure 1 is a front view of an index element embodying the invention, in normal position;

Figure 2 is a rear view partly broken away;

Figure 3 is a front view showing the front leaf swung to open position; and

Figure 4 is an enlarged section on line 4—4 of Fig. 1.

The relatively long and narrow, flat, supporting bar 5 may be made of Bristol board or other suitable material, and projects at both ends beyond the side edges of the record leaves to engage a suitable frame (not shown) in the usual manner.

Attached to the supporting bar are two leaves made from an integral sheet of paper or the like folded upon itself along a crease 6, which constitutes a hinge for the front leaf 8. In normal depending position shown in Fig. 1 the front leaf overlies the rear leaf 9. The margin 10 of the rear leaf adjacent said fold 6 is attached by cement, or in some other suitable way, to the face of the supporting bar 5. A second hinge crease 7 is provided in the rear leaf 9 adjacent the bar 5 and parallel to the hinge crease 6. Thus the marginal section 10 between the creases 6 and 7 forms an attaching section of substantially the same width as the supporting bar intermediate the two hinged parts, and the front leaf 8 extends from the upper edge of the supporting bar, while the rear leaf 9 extends from the lower edge of the supporting bar.

The front leaf is preferably shorter than the rear leaf to expose the lower margin of the latter, on which a name or other data may be displayed, so as to be always in view whether the front leaf is in normal position as shown in Fig. 1 or is swung upward to expose its rear surface and the front surface of the rear leaf as shown in Fig. 3. For making or inspecting entries on the rear side of the rear leaf 9 the latter may also be swung upward on its hinge crease 7.

I claim:

1. An index element comprising a relatively long and narrow, flat, supporting bar, and a sheet folded upon itself to form two leaves, one normally overlying the other, the margin of the rear leaf adjacent said fold being secured to the flat face of the supporting bar.

2. An index element comprising a relatively long and narrow, flat, supporting bar, and a sheet folded upon itself to form two leaves, one normally overlying the other, the margin of the rear leaf adjacent said fold being secured to the flat face of the supporting bar and the rear leaf having a hinge crease adjacent the bar.

3. An index element comprising a relatively long and narrow, flat, supporting bar, and a sheet creased along parallel lines to form a front leaf, a rear leaf, and an intermediate attaching section, the intermediate section being attached to the face of the supporting bar and the two leaves being hinged to the bar by said parallel creases.

Signed by me at Boston, Massachusetts, this ninth day of June, 1921.

JAMES H. RAND.